United States Patent
Inoue Sardenberg

(10) Patent No.: US 12,272,087 B2
(45) Date of Patent: Apr. 8, 2025

(54) SYSTEMS AND METHODS FOR ESTIMATING OBJECT WEIGHT USING CAMERA IMAGES

(71) Applicant: Caterpillar Inc., Peoria, IL (US)

(72) Inventor: Lucas Inoue Sardenberg, Oak Park, IL (US)

(73) Assignee: Caterpillar Inc., Peoria, IL (US)

( * ) Notice: Subject to any disclaimer, the term of this patent is extended or adjusted under 35 U.S.C. 154(b) by 474 days.

(21) Appl. No.: 17/808,928

(22) Filed: Jun. 24, 2022

(65) Prior Publication Data

US 2023/0419525 A1 Dec. 28, 2023

(51) Int. Cl.
| | |
|---|---|
| *G06T 7/00* | (2017.01) |
| *G06T 7/60* | (2017.01) |
| *G06T 7/90* | (2017.01) |
| *G06V 10/774* | (2022.01) |
| *G06V 10/82* | (2022.01) |
| *G06V 20/50* | (2022.01) |

(52) U.S. Cl.
CPC ............ *G06T 7/60* (2013.01); *G06T 7/90* (2017.01); *G06V 10/774* (2022.01); *G06V 10/82* (2022.01); *G06V 20/50* (2022.01); *G06T 2207/10024* (2013.01); *G06T 2207/20081* (2013.01); *G06T 2207/20084* (2013.01)

(58) Field of Classification Search
CPC .......... G06T 2207/20084; G06T 2207/20081; G06V 10/82; G06V 2201/06; G06V 10/70; G06V 20/60
See application file for complete search history.

(56) References Cited

U.S. PATENT DOCUMENTS

| | | |
|---|---|---|
| 11,124,947 B2 | 9/2021 | Miller |
| 2018/0179732 A1* | 6/2018 | Bartsch ............... E02F 9/205 |
| 2020/0063399 A1* | 2/2020 | Miller ............... E02F 9/265 |

(Continued)

FOREIGN PATENT DOCUMENTS

| | | |
|---|---|---|
| CN | 106044663 B | 12/2018 |
| CN | 113911916 | 1/2022 |

(Continued)

OTHER PUBLICATIONS

Zhou, Ying, et al. "Image-based onsite object recognition for automatic crane lifting tasks." Automation in construction 123 (2021): 103527.*

(Continued)

*Primary Examiner* — Li Liu

(57) ABSTRACT

In some aspects, the techniques described herein relate to a method for object weight estimation, including: training an object identification model; receiving one or more images from a camera positioned on a machine engaged in a lifting operation; feeding each of the one or more images into the object identification model; receiving, from the trained object identification model, a predicted object corresponding to the object to be lifted by the machine and a probability that the predicted object corresponds to the object being lifted by the machine; and estimating a weight of the object based on at least the predicted object and comparing the estimated weight to lifting parameters associated with the machine when the probability is greater than a selected confidence threshold.

20 Claims, 8 Drawing Sheets

(56) References Cited

U.S. PATENT DOCUMENTS

| | | | |
|---|---|---|---|
| 2021/0310219 A1 | 10/2021 | Aizawa et al. | |
| 2021/0350114 A1 | 11/2021 | Ram | |
| 2022/0084238 A1* | 3/2022 | Tang | ................... G06V 20/10 |
| 2022/0188565 A1* | 6/2022 | Reaume | ............... G06V 10/761 |
| 2023/0368414 A1* | 11/2023 | Afrooze | .................. G06N 3/08 |

FOREIGN PATENT DOCUMENTS

| | | |
|---|---|---|
| DE | 102019217008 B4 | 6/2021 |
| JP | 2021139775 A | 9/2021 |
| WO | 2012139575 A1 | 10/2012 |

OTHER PUBLICATIONS

Written Opinion and International Search Report for Int'l. Patent Appln. No.PCT/US2023/022323, mailed Aug. 4, 2023 (40 pgs).

* cited by examiner

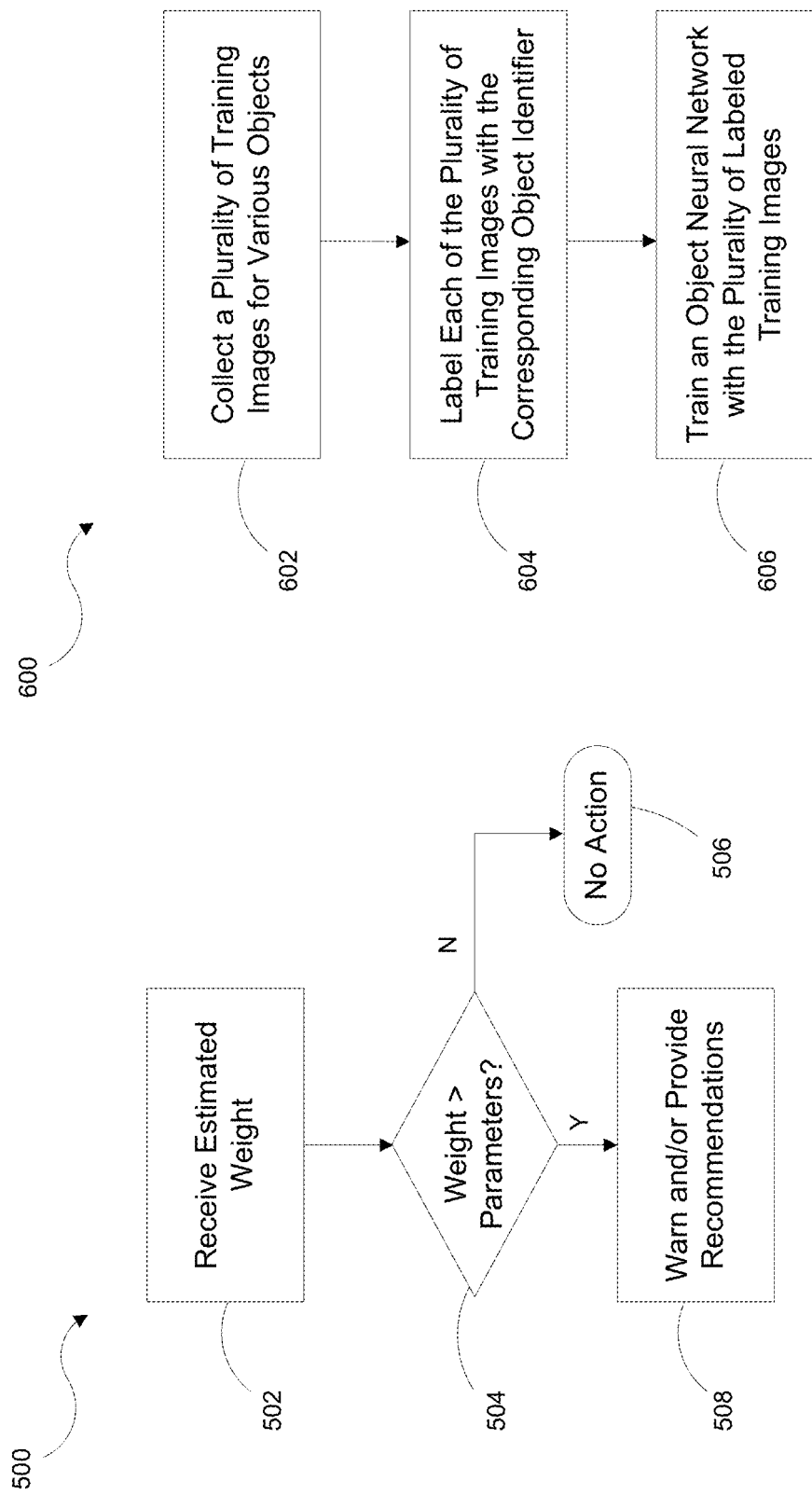

SYSTEMS AND METHODS FOR ESTIMATING OBJECT WEIGHT USING CAMERA IMAGES

TECHNICAL FIELD

This patent application is directed to object identification, and more specifically, to object identification and weight estimation using camera images.

BACKGROUND

In many applications a machine operator is required to pick-up objects of different sizes and weights. If the operator is not familiar with the machine's limitations or an object's weight, the operator may try to pick the object up and move it. This can create stress on the machine structure and components, and cause instability. Most machines have specific charts for weight-lifting capabilities, but they can be complicated and time consuming to apply. Furthermore, the weight of the object needs to be determined via other means (sales sheet, bill of landing, etc.). Having functionality in the machine that can identify the object and estimate the weight and implications due to size would eliminate the guess work from the operator and provide better overall performance of the machine.

Efforts have been made to estimate the weight of a load prior to lifting. For example, CN106044663B to University Fujian Technology, (hereinafter "UFT") describes weight measurement for a forklift using a camera, an algorithm, and infrared sensors. According to UFT the camera and the laser radars are used as information acquisition means, so that the weight of rough stone blocks to be loaded or unloaded can be measured accurately in order to avoid the phenomenon that the forklift is in overload operation due to inaccurate estimation of an operator.

UFT is directed to calculating a volume of a stone and applying a density value to determine its weight. The density is determined by extracting a color of the stone and comparing the color with stone type information contained in a database. Therefore, UFT is not capable of identifying various objects, such as concrete boxes, pipes, logs and trench boxes, to name a few.

Thus, there is a need for systems and methods to automatically identify objects using camera images and estimating the weight of objects based in the identification. The example systems and methods described herein are directed toward overcoming one or more of the deficiencies described above and/or other problems with the prior art.

SUMMARY

In some aspects, the techniques described herein relate to a method for object weight estimation, including: training an object identification model; receiving one or more images from a camera positioned on a machine engaged in a lifting operation; feeding each of the one or more images into the object identification model; receiving, from the trained object identification model, a predicted object corresponding to the object to be lifted by the machine and a probability that the predicted object corresponds to the object being lifted by the machine; and estimating a weight of the object based on at least the predicted object and comparing the estimated weight to lifting parameters associated with the machine when the probability is greater than a selected confidence threshold.

In some aspects, the techniques described herein relate to a method, further including providing a recommendation when the estimated weight exceeds one or more of the lifting parameters.

In some aspects, the techniques described herein relate to a method, wherein training the object identification model, includes: collecting a plurality of training images for each of a plurality of objects; labeling each of the plurality of training images with a corresponding one of a plurality of object identifiers; and training an object neural network with the plurality of labeled training images.

In some aspects, the techniques described herein relate to a method, further including, when the probability is less than the selected confidence threshold, receiving additional images from the camera and feeding the additional images into the trained object identification model until the probability is greater than the selected confidence threshold.

In some aspects, the techniques described herein relate to a method, wherein the selected confidence threshold is selected based on a type of the predicted object.

In some aspects, the techniques described herein relate to a method, wherein the weight of the object is estimated based on a color of the object.

In some aspects, the techniques described herein relate to a method, further including indicating when the estimated weight exceeds one or more of the lifting parameters.

In some aspects, the techniques described herein relate to a system for improving machine performance based on machine application identification, including: one or more cameras positioned on a machine; one or more processors; and one or more memory devices having stored thereon instructions that when executed by the one or more processors cause the one or more processors to: train an object identification model; receive one or more images from the one or more cameras; feed each of the one or more images into the object identification model; receive, from the trained object identification model, a predicted object corresponding to an object to be lifted by the machine and a probability that the predicted object corresponds to the object to be lifted by the machine; and estimate a weight of the object based on at least the predicted object and compare the estimated weight to lifting parameters associated with the machine when the probability is greater than a selected confidence threshold.

In some aspects, the techniques described herein relate to a system, further including providing a recommendation when the estimated weight exceeds one or more of the lifting parameters.

In some aspects, the techniques described herein relate to a system, wherein training the object identification model, includes: collecting a plurality of training images for each of a plurality of objects; labeling each of the plurality of training images with a corresponding one of a plurality of object identifiers; and training an object neural network with the plurality of labeled training images.

In some aspects, the techniques described herein relate to a system, further including, when the probability is less than the selected confidence threshold, receiving additional images from the camera and feeding the additional images into the trained object identification model until the probability is greater than the selected confidence threshold.

In some aspects, the techniques described herein relate to a system, wherein the selected confidence threshold is selected based on a type of the predicted object.

In some aspects, the techniques described herein relate to a system, wherein the weight of the object is estimated based on a color of the object.

In some aspects, the techniques described herein relate to a system, further including an indicator on the machine communicatively coupled to the one or more processors and operative to indicate when the estimated weight exceeds one or more of the lifting parameters.

In some aspects, the techniques described herein relate to one or more non-transitory computer-readable media storing computer-executable instructions that, when executed by one or more processors, cause the one or more processors to perform operations including: training an object identification model; receiving one or more images from a camera positioned on a machine engaged in a lifting operation; feeding each of the one or more images into the object identification model; receiving, from the trained object identification model, a predicted object corresponding to the object to be lifted by the machine and a probability that the predicted object corresponds to the object being lifted by the machine; and estimating a weight of the object based on at least the predicted object and comparing the estimated weight to lifting parameters associated with the machine when the probability is greater than a selected confidence threshold.

In some aspects, the techniques described herein relate to one or more non-transitory computer-readable media, further including providing a recommendation when the estimated weight exceeds one or more of the lifting parameters.

In some aspects, the techniques described herein relate to one or more non-transitory computer-readable media, wherein training the object identification model, includes: collecting a plurality of training images for each of a plurality of objects; labeling each of the plurality of training images with a corresponding one of a plurality of object identifiers; and training an object neural network with the plurality of labeled training images.

In some aspects, the techniques described herein relate to one or more non-transitory computer-readable media, further including, when the probability is less than the selected confidence threshold, receiving additional images from the camera and feeding the additional images into the trained object identification model until the probability is greater than the selected confidence threshold.

In some aspects, the techniques described herein relate to one or more non-transitory computer-readable media, wherein the selected confidence threshold is selected based on a type of the predicted object.

In some aspects, the techniques described herein relate to one or more non-transitory computer-readable media, wherein the weight of the object is estimated based on a color of the object.

BRIEF DESCRIPTION OF THE DRAWINGS

The systems and methods described herein may be better understood by referring to the following Detailed Description in conjunction with the accompanying drawings, in which like reference numerals indicate identical or functionally similar elements:

FIG. 5 is a flow diagram showing a method for providing recommendations when a weight parameter is exceeded according to some embodiments of the disclosed technology;

FIG. 6 is a flow diagram showing a method for training an object neural network of an application identification model according to some embodiments of the disclosed technology;

Figure 1:
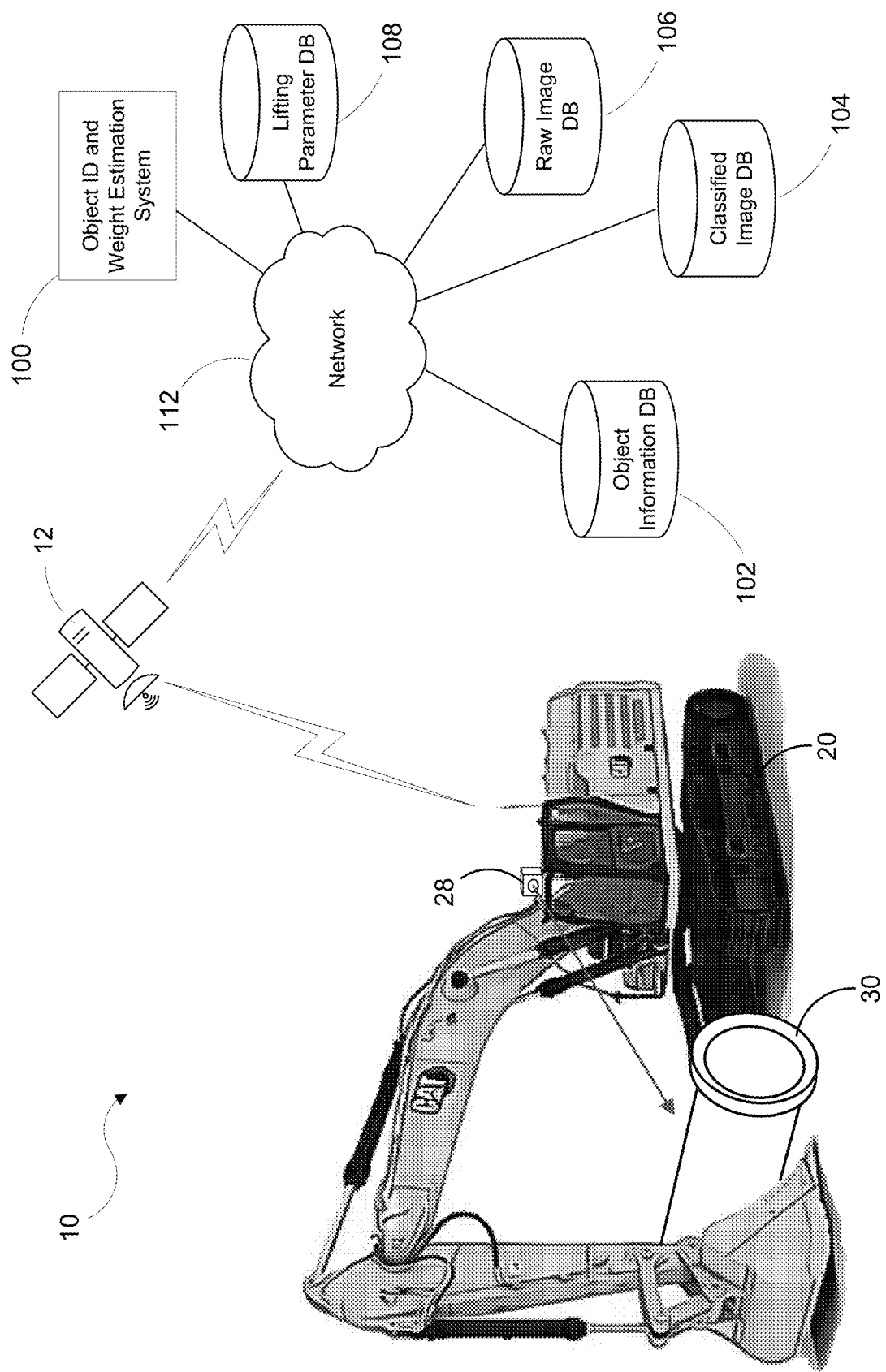
FIG. 1 is a diagram illustrating an overview of an environment in which some implementations can operate according to embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates an environment 10 in which some implementations of the object identification and weight estimation system 100 can operate according to embodiments of the disclosed technology. The system environment 10 can include one or more machines, such as excavator 20, a satellite 12, an object information database 102, a classified image database 104, a raw image database 106, a lifting parameter database 108, and a network 112. The object identification and weight estimation system 100 can be connected to the object information database 102, the classified image database 104, the raw image database 106, and the lifting parameter database 108 via network 112.

The raw image database 106 and the system 100 can receive images from one or more cameras 28 positioned on the excavator 20 via satellite 12, for example. In some embodiments, the system 100 can also receive telematics data from the excavator 20 via satellite 12. The telematics data can include sensor data from the excavator, such as from a pressure sensor, a vibration sensor, and a temperature sensor, to name a few. In some embodiments, the images and telematics data can also be received via cellular, wi-fi, or other wireless communication.

The images from camera 28 can be used to identify an object, such as concrete pipe 30, to be lifted by the machine 20. The camera 28 can be any type of analog or digital image sensor, digital camera, and/or digital video camera. For example, the camera 28 can be a high dynamic range (HDR) camera, a light-sensitive camera, and/or an ultra-sonic camera. In some embodiments, the cameras may provide two-dimensional image data, three-dimensional image data, image sequences, gray image data, and/or color image data. In some embodiments, the system 100 can further include any known type of sensor, such as one or more light detection and ranging (LIDAR) sensors, one or more sound navigation ranging (SONAR) sensors, one or more radio detection and ranging (RADAR) sensors, or any other suitable sensor type. In some embodiments, the cameras 28 can be added to the machines or can be originally provided on the machine from the manufacturer.

Figure 2:
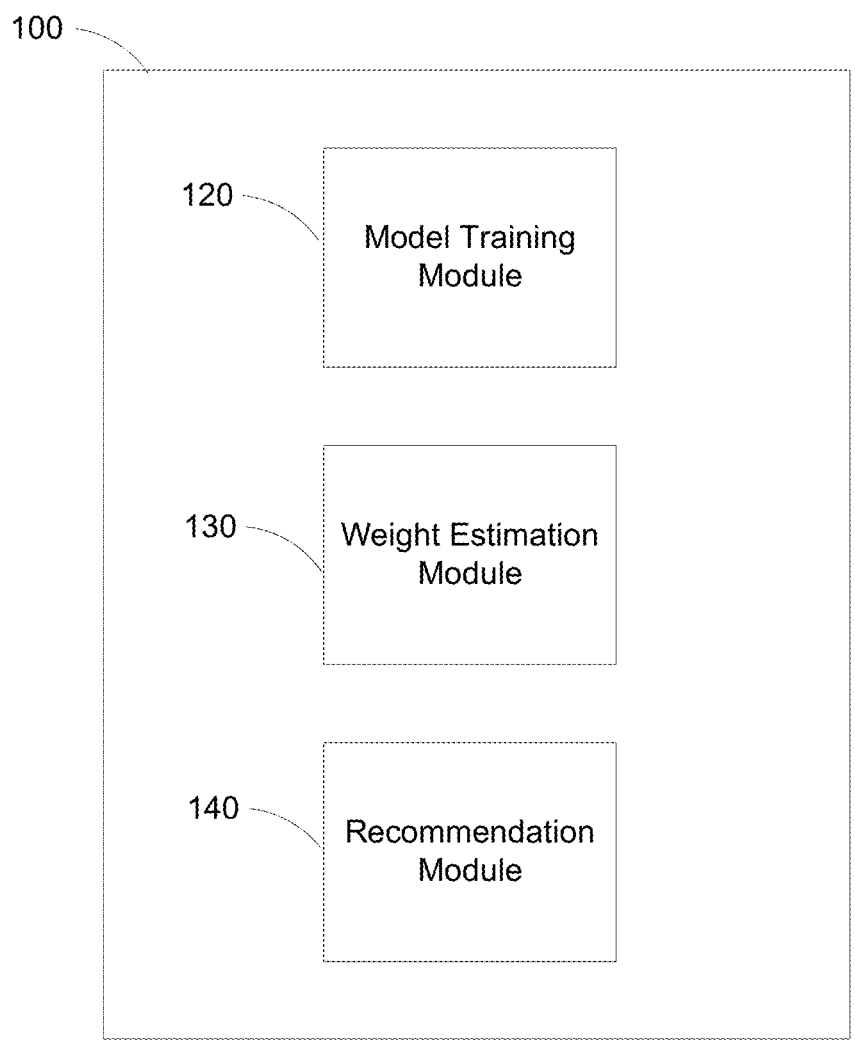
FIG. 2 is a block diagram illustrating an overview of an object identification and weight estimation system according to some embodiments of the disclosed technology.

As shown in FIG. 2, the object identification and weight estimation system 100 can comprise a model training module 120, a weight estimation module 130, and a recommendation module 140. In some embodiments, the model training module 120 can be configured to receive a plurality of training images for each of a plurality of objects from the classified images database 104. Each of the images can be labeled with a corresponding one of a plurality of object identifiers. The model training module 120 can be configured to train an object neural network with the plurality of labeled training images.

In some embodiments, the weight estimation module 130 is configured to receive one or more images from the raw image database 106 and/or camera 28 positioned on a machine 20 engaged in a lifting operation. The module 130 feeds each of the one or more images into the trained object identification model. In some embodiments, the weight estimation module 130 receives, from the trained object identification model, a predicted object corresponding to the object being lifted by the machine 20 and a probability that the predicted object corresponds to the object being performed by the machine 20. The module 130 can retrieve object information, including weight, for the identified object from object information database 102.

In some embodiments, the recommendation module 140 is configured to retrieve machine lifting parameters from the lifting parameter database 108 and compare the estimated weight of the object with the parameters. If the estimated weight of the object is beyond the capacity of the machine, as defined by the lifting parameters for that machine, the module can provide a warning and/or recommendations to the operator prior to commencing the lifting operation. For example, the system can recommend adjusting an operation to maintain the load close to the machine and not too high; picking objects one at-a-time vs. bunched together; or not to proceed with a lifting operation.

Figure 3:
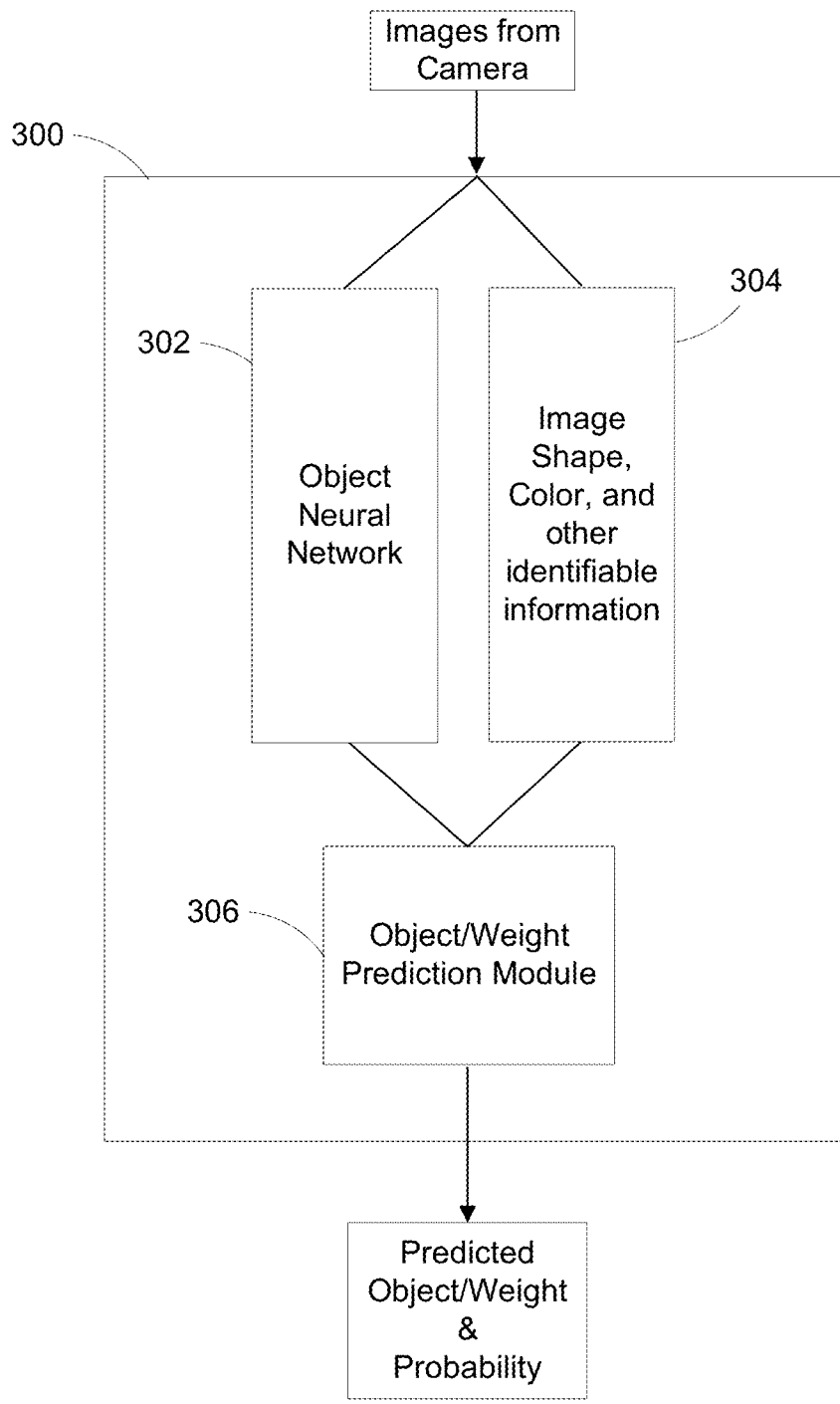
FIG. 3 is a block diagram illustrating an overview of an object identification model according to some embodiments of the disclosed technology.

FIG. 3 is a block diagram illustrating an overview of an object identification and weight estimation model 300 according to some embodiments of the disclosed technology. The object identification model 300 can include an object identification neural network 302, an object properties model 304, and an object/weight prediction module 306. One or more raw images from the camera 28 and/or the raw image database 106 are fed into the trained object neural network 302 and the object properties model 304. The object identification neural network 302 outputs an object identifier corresponding to the object to be lifted by the machine and a probability that the object identifier corresponds to the object to be lifted by the machine. The object properties model 304 identifies additional features of the object such as shape, color, and other identifiable information e.g., part number. The object/weight prediction module 306 combines the object identifier and object properties in order to identify the object. For example, the color of a pipe can help determine if it is concrete or plastic. The object/weight prediction module 306 can output a predicted object, weight, and a probability that the predicted object corresponds to the object to be lifted by the machine.

The object identifier and object properties can be combined in order to provide the maximum confidence level that the object is properly identified. In some embodiments, a set of rules and mathematical weights can be applied to the object identifier and object properties. The results are classified using a decision tree algorithm. This process works on individual raw images and loops over time accumulating object and probability results. If results are changing more often than a set threshold, the loop continues to process additional images to reach an acceptable consistency metric, which is then transformed into the object identifier and corresponding probability.

Figure 4:
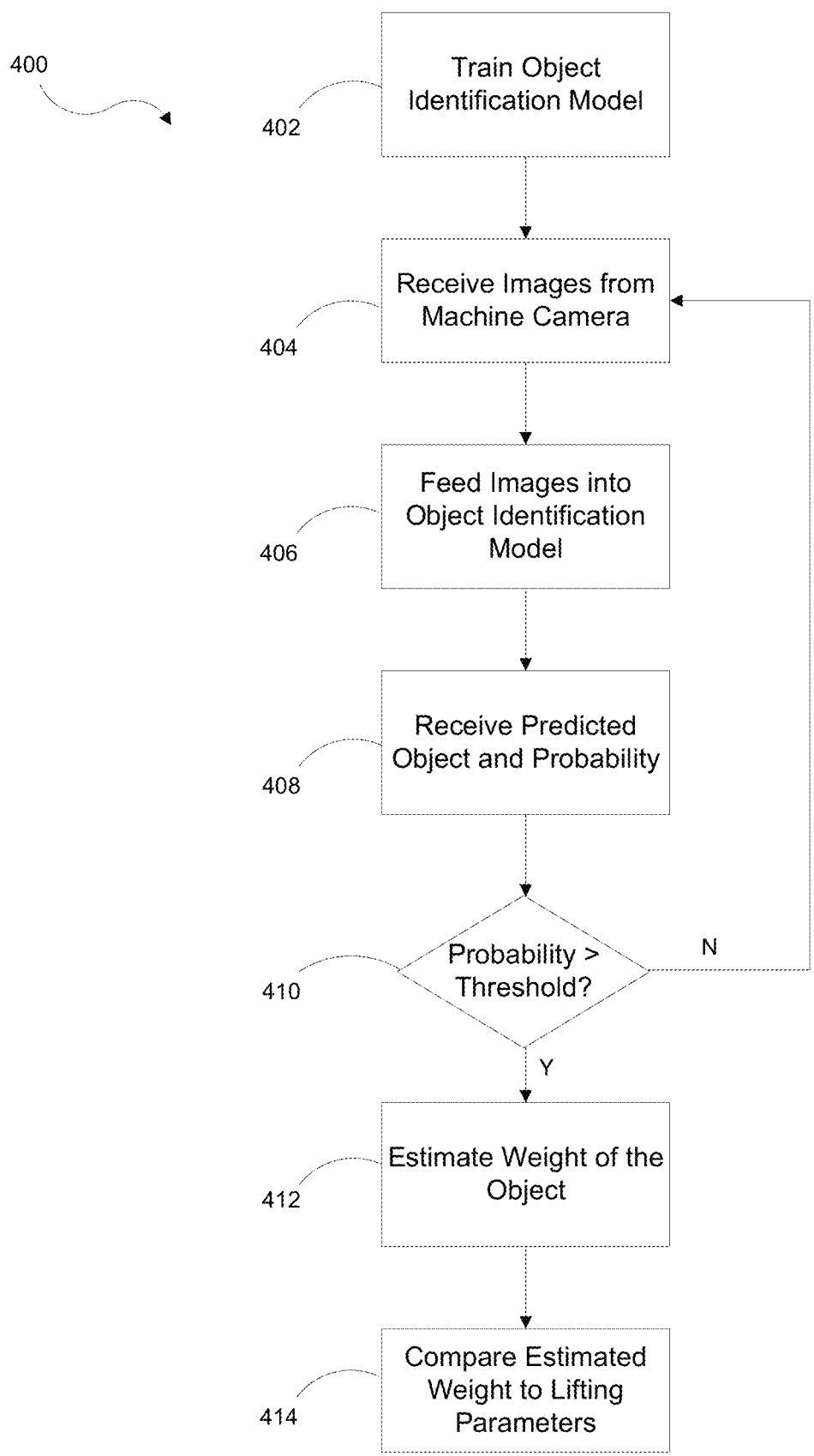
FIG. 4 is a flow diagram showing a method for object identification and weight estimation according to some embodiments of the disclosed technology.

FIG. 4 is a flow diagram showing a method 400 for object identification and weight estimation according to some embodiments of the disclosed technology. The method 400 can include training an object identification model at step 402, which is further described below with respect to FIG. 6. One or more images are received from a camera positioned on a machine engaged in lifting an object at step 404. At step 406 the images are fed into the trained object identification model, such as the object identification model 300 described above with respect to FIG. 3. At step 408, a predicted object corresponding to the object to be lifted by the machine and a probability that the predicted object corresponds to the object being lifted are received from the trained object identification model. At step 410, it is determined whether the probability that the predicted object corresponds to the object to be lifted by the machine is greater than a selected threshold (e.g., 80%). When the probability is greater than the selected threshold at step 410, object information, including weight, are retrieved based on the predicted object at step 412 and compared to the machine's lifting parameters at step 414. When the probability is less than the selected confidence threshold at step 410, the method includes receiving additional images from the camera at step 404 and feeding the additional images into the trained application identification model at step 406 until the probability is greater than the selected confidence threshold. The entire process can run in a loop until the machine is turned off in order to constantly identify what object(s) the machine is lifting. In some embodiments, the selected confidence threshold is selected based on a type of the object to be lifted.

FIG. 5 is a flow diagram showing a method 500 for providing recommendations when a weight parameter is exceeded. At step 502 the weight estimate is received and compared to the machines weight lifting parameters at step 504. If the weight does not exceed the lifting parameters then no action is necessary at 506. If the weight does exceed the lifting parameters of the machine the system can warn and/or provide a recommendation to the operator at step 508.

For example, the system can recommend adjusting an operation to maintain the load close to the machine and not too high; picking objects one at-a-time vs. bunched together; or not to proceed with an operation. In one implementation, for a machine attempting to pick-up a concrete sewer box and lid combination, the system can recommend lifting the box and lid separately in order to reduce the maximum weight of the lift. In another implementation, for a machine attempting to pick up a large tree log, the system can inform the operator that the lift is not possible with the current machine. In one implementation, for a machine attempting to lift and place an object too far from the machine, the system can recommend that the operator move the machine instead of its implements. In another implementation, the system can recognize via the camera that the machine is attempting to lift two concrete pipes. If the total estimated weight of the two pipes are within the machine operating parameters, no recommendation is needed. However, if the weight is outside the machine operating parameters, the system can recommend lifting one pipe at a time. In one implementation, the system can recognize via the camera that the machine is attempting to lift a trench box. Based on the information for the trench box e.g., object weight, the system can determine maximum operating parameters for the lift e.g., how far and how high the machine can lift the trench box without stability or hydraulic limitations.

FIG. 6 is a flow diagram showing a method 600 for training an object neural network of an application identification model according to some embodiments of the disclosed technology. The method 600 can include collecting a plurality of training object images for each of a plurality of objects at step 602. At step 604, each of the plurality of training object images is labeled with a corresponding one of a plurality of object identifiers. At step 606, the method includes training an object neural network with the plurality of labeled training object images.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc rea-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 7:
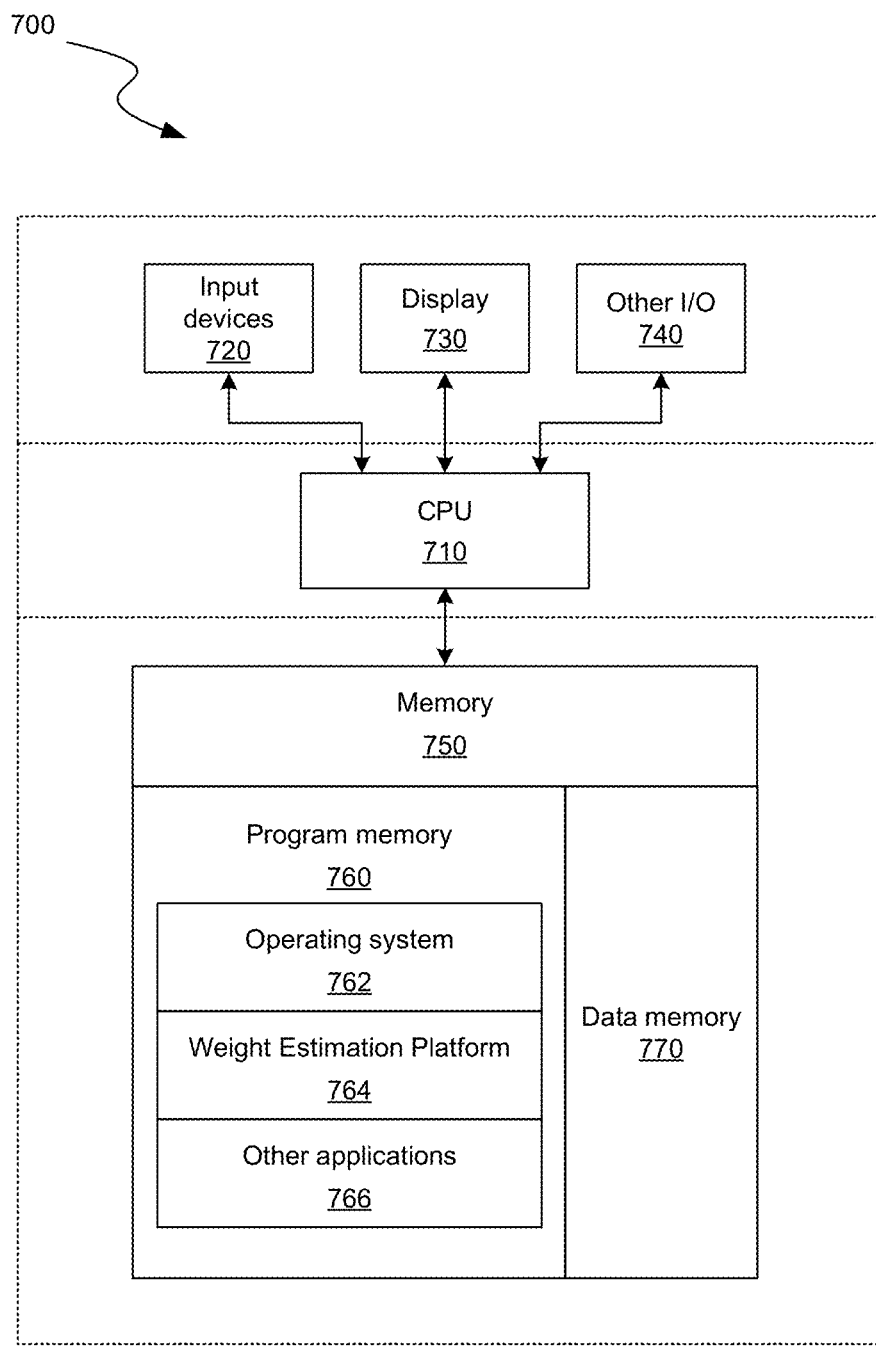
FIG. 7 is a block diagram illustrating an overview of devices on which some implementations can operate.

Several implementations are discussed below in more detail in reference to the figures. FIG. 7 is a block diagram illustrating an overview of devices on which some implementations of the disclosed technology can operate. The devices can comprise hardware components of a device 700 that performs object identification and weight estimation, for example. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, weight estimation Platform 764, and other application programs 766. Memory 750 can also include data memory 770 that can include database information, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 8:
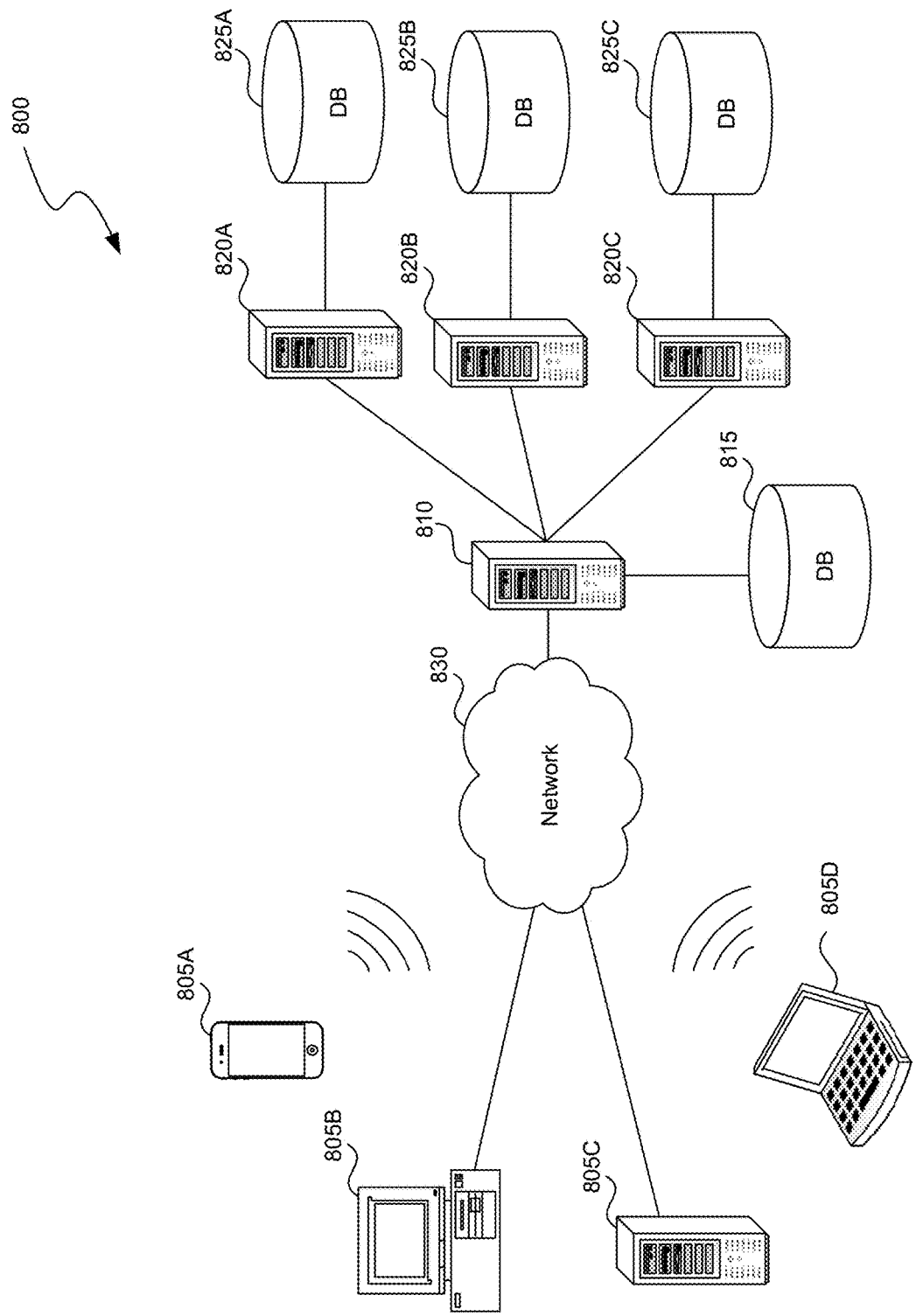
FIG. 8 is a block diagram illustrating an overview of an environment in which some implementations can operate.

FIG. 8 is a block diagram illustrating an overview of an environment 800 in which some implementations of the disclosed technology can operate. Environment 800 can include one or more client computing devices 805A-D, examples of which can include device 700. Client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 9:
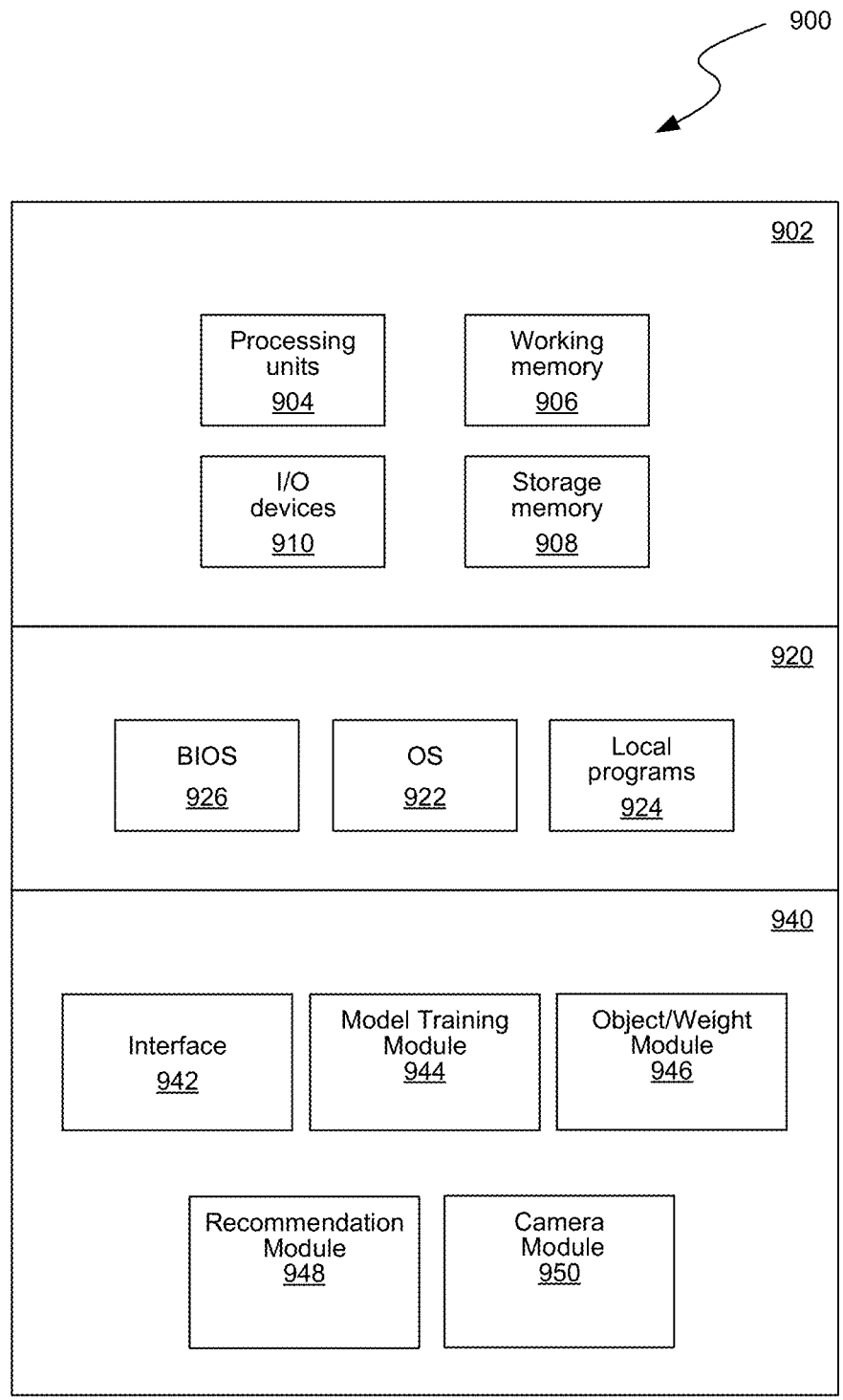
FIG. 9 is a block diagram illustrating components which, in some implementations, can be used in a system employing the disclosed technology.

FIG. 9 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include a Model Training Module 944, an Object/Weight Module 946, a Recommendation Module 948, a Camera Module 950, and components that can be used for transferring data and controlling the specialized components, such as Interface 942. In some implementations, components 900 can be in a computing system that is distributed across multiple computing devices or can be an interface to a server-based application executing one or more of specialized components 940.

Those skilled in the art will appreciate that the components illustrated in FIGS. 7-9 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

Industrial Applicability

In some embodiments, an object identification and weight estimation system 100 can include a model training module 944, an object/weight module 946, a recommendation module 948, and a camera module 950 (FIG. 9). In operation, the model training module 944 can train an object identification model 300 by collecting a plurality of training images for each of a plurality of objects and labeling the images with a corresponding one of a plurality of object identifiers. In some embodiments, these labeled images can be stored in and retrieved from the classified image database 104. Training the object identification model 300 can include training an object neural network 302 with the plurality of labeled training images.

The object/weight module 946 can include the trained object identification model 300. The module 946 can receive one or more images directly from the camera 28 positioned on the machine 20 performing a lifting operation (e.g., lifting pipe 30). In some embodiments the images from camera 28 can be stored in and retrieved from the raw image database 106. The images are fed into the trained object identification model 300 and the model outputs a predicted object corresponding to the object to be lifted and a probability that the predicted object corresponds to the object to be lifted by the machine. In some embodiments, the object identification model includes identifying additional characteristics of the object 304. For example, the length of a pipe and color (i.e., material) of a pipe can help determine the weight of a pipe. Once the object is identified, information about the object, particularly weight, can be retrieved from the object information database 102. In some embodiments, the object information can be contained in a lookup table with weights for different lengths, colors, etc.

When the probability is greater than the selected threshold, the recommendation module 948 retrieves the lifting parameters associated with the machine from the lifting parameter database 108, compares them with the estimated weight of the object, and provides recommendations accordingly. When the probability is less than the selected confidence threshold, additional images are retrieved from the camera 28 and fed into the trained object identification model 300 until the probability is greater than the selected confidence threshold.

In some embodiments, the system 100 can include a camera module 950. The camera module 950 can retrieve images from the camera 28 and store the raw images in the raw image database 106. In some embodiments the camera module 950 can perform pre-processing on the images to improve picture quality, such a filtering and contrast adjustments, for example.

In an example application, the system 100 can recognize via images from camera 28, with a high probability, that the machine 20 is lifting a heavy object (e.g., a 24" pipe 30). The system can also use the images to determine the length (e.g., 12 feet) of the pipe and color (e.g., white). Based on the color the system 100 determines that the pipe is concrete. Looking up the information for a 12 foot concrete pipe from the object information database 102 the system determines that the pipe weighs approximately 3200 lbs. The system compares 3200 lbs. with the lifting parameters retrieved from the database 108 and determines that 3200 lbs. is within the machine's lifting parameters but the load must be maintained close to the machine's base. Thus, the system will provide a recommendation to the operator to keep the pipe close to the machine base.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for object weight estimation, comprising:
   training an object identification model;
   receiving one or more images from a camera positioned on a machine engaged in a lifting operation;
   feeding each of the one or more images into the object identification model;
   receiving, from the trained object identification model, a predicted object corresponding to the object to be lifted by the machine and a probability that the predicted object corresponds to the object being lifted by the machine; and
   estimating a weight of the object based on at least the predicted object and comparing the estimated weight to lifting parameters associated with the machine when the probability is greater than a selected confidence threshold.

2. The method of claim 1, further comprising providing a recommendation when the estimated weight exceeds one or more of the lifting parameters.

3. The method of claim 1, wherein training the object identification model, comprises:
   collecting a plurality of training images for each of a plurality of objects;
   labeling each of the plurality of training images with a corresponding one of a plurality of object identifiers; and
   training an object neural network with the plurality of labeled training images.

4. The method of claim 1, further comprising, when the probability is less than the selected confidence threshold, receiving additional images from the camera and feeding the additional images into the trained object identification model until the probability is greater than the selected confidence threshold.

5. The method of claim 1, wherein the selected confidence threshold is selected based on a type of the predicted object.

6. The method of claim 1, wherein the weight of the object is estimated based on a color of the object.

7. The method of claim 1, further comprising indicating when the estimated weight exceeds one or more of the lifting parameters.

8. A system for object weight estimation, comprising:
   one or more cameras positioned on a machine;
   one or more processors; and
   one or more memory devices having stored thereon instructions that when executed by the one or more processors cause the one or more processors to:
   train an object identification model;
   receive one or more images from the one or more cameras;
   feed each of the one or more images into the object identification model;
   receive, from the trained object identification model, a predicted object corresponding to an object to be lifted by the machine and a probability that the predicted object corresponds to the object to be lifted by the machine; and
   estimate a weight of the object based on at least the predicted object and compare the estimated weight to lifting parameters associated with the machine when the probability is greater than a selected confidence threshold.

9. The system of claim 8, further comprising providing a recommendation when the estimated weight exceeds one or more of the lifting parameters.

10. The system of claim 8, wherein training the object identification model, comprises:
    collecting a plurality of training images for each of a plurality of objects;
    labeling each of the plurality of training images with a corresponding one of a plurality of object identifiers; and
    training an object neural network with the plurality of labeled training images.

11. The system of claim 8, further comprising, when the probability is less than the selected confidence threshold, receiving additional images from the camera and feeding the additional images into the trained object identification model until the probability is greater than the selected confidence threshold.

12. The system of claim 8, wherein the selected confidence threshold is selected based on a type of the predicted object.

13. The system of claim 8, wherein the weight of the object is estimated based on a color of the object.

14. The system of claim 8, further comprising an indicator on the machine communicatively coupled to the one or more processors and operative to indicate when the estimated weight exceeds one or more of the lifting parameters.

15. One or more non-transitory computer-readable media storing computer-executable instructions that, when executed by one or more processors, cause the one or more processors to perform operations comprising:
   training an object identification model;
   receiving one or more images from a camera positioned on a machine engaged in a lifting operation;
   feeding each of the one or more images into the object identification model;
   receiving, from the trained object identification model, a predicted object corresponding to the object to be lifted by the machine and a probability that the predicted object corresponds to the object being lifted by the machine; and
   estimating a weight of the object based on at least the predicted object and comparing the estimated weight to lifting parameters associated with the machine when the probability is greater than a selected confidence threshold.

16. The one or more non-transitory computer-readable media of claim 15, further comprising providing a recommendation when the estimated weight exceeds one or more of the lifting parameters.

17. The one or more non-transitory computer-readable media of claim 15, wherein training the object identification model, comprises:
   collecting a plurality of training images for each of a plurality of objects;
   labeling each of the plurality of training images with a corresponding one of a plurality of object identifiers; and
   training an object neural network with the plurality of labeled training images.

18. The one or more non-transitory computer-readable media of claim 15, further comprising, when the probability is less than the selected confidence threshold, receiving additional images from the camera and feeding the additional images into the trained object identification model until the probability is greater than the selected confidence threshold.

19. The one or more non-transitory computer-readable media of claim 15, wherein the selected confidence threshold is selected based on a type of the predicted object.

20. The one or more non-transitory computer-readable media of claim 15, wherein the weight of the object is estimated based on a color of the object.

* * * * *